Patented Apr. 12, 1927.

1,624,153

UNITED STATES PATENT OFFICE.

EDMUND H. TWIGHT, OF FRESNO, CALIFORNIA.

FOOD PRODUCT.

No Drawing.   Application filed July 27, 1925.   Serial No. 46,484.

My invention relates to a food product, particularly a candy, and the method of making it.

One of the objects of the invention is the provision of a candy, similar to taffy, made from fruit juices alone, without added sugar or other thickening materials.

My invention possesses other objects and features of advantage, some of which, with the foregoing, will be set forth in the following description of my invention. It is to be understood that I do not limit myself to the showing made by the said description as I may adopt variant forms of my invention within the scope of the claims.

Broadly my invention comprises the concentration or thickening of a fruit juice, such as grape juice, to a syrup-like consistency, further concentrating such juice until a thick but plastic mass is obtained, and then pulling or kneading this concentrate to incorporate minute bubbles of gas until a very thick product is formed the hardening of which is imminent, and which becomes substantially solid upon standing. The product of my invention is a candy, closely resembling taffy, and it can be cut, packed or otherwise handled in the same manner as taffy.

The first steps of my process are substantially those now commonly used in making fruit syrups. That is to say, the juice is extracted from the fruit by pressing or diffusion. The juice is then clarified and filtered and finally concentrated, preferably in a vacuum evaporator, until it reaches about 68 degrees Balling, or more, according to the juice under treatment.

The thickened syrup or concentrate thus obtained is then discharged into a rotary vacuum drier, of the type commonly used in the milk industry to convert condensed milk into a milk powder, so that thin films of the syrup are subjected to a high vacuum. The rotary vacuum drier operates under a very high vacuum, and the desired degree of concentration is obtained rapidly. The vacuum in the drier must be kept very high so that the product will not lose its flavor or become darkened, as is the tendency with a slight raise in temperature. The juice is preferably concentrated until it tests substantially 94% solids or more. This highly concentrated product is then scraped from the drum of the drier and conveyed to a steam jacketed container so as to maintain its plastic condition pending the next step.

The plastic product thus obtained is then placed on a pulling or kneading machine and worked violently so that as much air as possible is incorporated while the mass is cooling. The candy has a tendency to solidify very quickly, and in order to prevent this, warm air or other gas may be injected into the mass. By this means a plastic consistency is maintained for a longer period of time and more air, or gas as the case may be, can be incorporated in the product. Instead of air, I may use carbonic acid gas, or nitrogen.

The finished product looks and tastes like taffy and may be cut and wrapped by the machinery customarily used for this purpose.

I shall now apply my process specifically to the making of fruit candy from grapes, but it is to be understood that I do not limit myself to the use of grape juice as many other fruit and berry juices may be used; and I have found that very desirable and satisfactory results may be obtained by the combination of two or more fruit juices such for example, as orange and grape juices, or strawberry, orange and grape juices.

I pass the grapes thru the usual crushing and stemming machinery, draining off the juice, and conveying the pulp to a diffusion battery where the remaining juice is recovered. The juice is then run thru a centrifugal separator to take out the larger part of the sediment, thus relieving of that task and greatly increasing the capacity of the filters thru which the juice must later pass.

The juice is next tested for acidity and its acidity corrected either by the addition of a neutralizing medium, such as milk of lime, or by an acidifying medium, such as citric or tartaric acid. The acidity of the juice must be as low as it is possible to get it without causing a darkening of the juice. In the case of grape juice, the acidity should be about .2 of 1%. A small amount of filter cell, say 2 to 4 pounds per 100 gallons of juice, is added and stirred thoroughly and then the juice is passed thru a filter press to clarify it.

The clear filtered juice is then subjected to treatment in a vacuum evaporator in which concentration is carried on under the highest vacuum possible, which should be not less than 26 inches. The concentration is preferably carried to about 68 degrees Balling, or even higher, before the juice is discharged into a rotary vacuum drier, where it is concentrated to approximately 94% solids.

A high vacuum, preferably 28 inches or more, must be maintained in the drier to preserve the flavor of the juice and to prevent it darkening, which is likely to happen when it is subjected to a slight rise in temperature. This concentration step is accomplished very quickly, usually in about half a minute, and the resultant product is a heavy thick plastic mass, which is scraped from the drum of the drier and conveyed to a jacketed container.

The container should be kept warm so that the plastic consistency of the mass will be maintained, until the pulling operation is begun, or the material is canned for later use.

Finally the plastic mass is placed on a pulling or kneading machine and worked vigorously so that as large an amount of air as possible is incorporated in the concentrated product. During this last step the product becomes quite light in color and tends to solidify very quickly, usually before the desired amount of air has been worked into it. In order to overcome this, warm air or gas may be injected into the mass during the pulling to aid the introduction of air into the mass and to maintain its plastic consistency for a longer time.

The product is removed from the pulling machine when very heavy and thick and shortly thereafter becomes substantially solid and hard so that it is readily handled. It may then be cut and wrapped by the usual machinery.

I claim:

1. The process of making a food product from fruit juice alone, which comprises concentrating the juice to form a plastic mass, and agitating the mass to incorporate air therein until solidification is imminent.

2. The process of making a food product from fruit juice alone, which comprises first concentrating the juice to a syrup, then drying out said syrup to form a plastic mass, and finally agitating the mass until solidification is imminent.

3. The process of making a food product from fruit juice alone, which comprises first concentrating the juice to a syrup, then drying out said syrup to form a plastic mass, and agitating the mass while incorporating a gas therein.

4. The process of making a food product from fruit juice alone, which comprises first concentrating the juice to a syrup, then drying out said syrup to form a plastic mass, and finally agitating the mass until solidification is imminent, meanwhile injecting warm gas into the mass to delay the solidification.

5. The process of making a food product from fruit juice alone, which comprises concentrating the juice to approximately 68 degrees Balling, drying out the concentrate to substantially 94% of solids, and agitating the resultant mass to incorporate air until it tends to solidify.

6. The process of making a food product from fruit juice alone, which comprises concentrating the juice to approximately 68 degrees Balling, drying out the concentrate to substantially 94% of solids, and agitating the resultant mass to incorporate air until it tends to solidify, the concentration and drying being carried out in a vacuum.

7. The process of making candy solely from fruit juice which comprises evaporating the juice in a vacuum to form a syrup and subjecting thin films of the syrup to further evaporation in a vacuum to form a plastic mass which tends to harden upon exposure to the atmosphere.

8. The process of making candy solely from fruit juice which comprises evaporating the juice in a vacuum to form a syrup and effecting a rapid drying out to a plastic mass which will harden upon exposure to the atmosphere, by subjecting thin films of the syrup to evaporation in a high vacuum and then agitating the dried-out material until solidification is imminent.

9. The process of making candy solely from fruit juice which comprises evaporating the juice to form a syrup, effecting a further rapid evaporation in a vacuum to a plastic consistency and kneading the plastic mass.

10. The process of making candy solely from fruit juice which comprises evaporating the juice to form a syrup, effecting a further rapid evaporation in a vacuum to a plastic consistency and kneading the plastic mass while incorporating a gas therein.

11. A candy comprising only solidified grape juice having an acidity of about .2 of 1%.

12. A candy comprising solidified fruit juice having minute bubbles of gas incorporated therein.

In testimony whereof, I have hereunto set my hand.

EDMUND H. TWIGHT.